(12) United States Patent
van Blokland

(10) Patent No.: US 9,861,223 B2
(45) Date of Patent: Jan. 9, 2018

(54) DEVICE FOR DISPENSING A DISPERSION

(71) Applicant: Radie B.V., Culemborg (NL)

(72) Inventor: Johannes Josephus Antonius van Blokland, Beusichem (NL)

(73) Assignee: Radie B.V., Culemborg (NL)

( * ) Notice: Subject to any disclaimer, the term of this patent is extended or adjusted under 35 U.S.C. 154(b) by 80 days.

(21) Appl. No.: 14/691,934

(22) Filed: Apr. 21, 2015

(65) Prior Publication Data

US 2015/0297016 A1    Oct. 22, 2015

(30) Foreign Application Priority Data

Apr. 22, 2014    (EP) .................................... 14165358

(51) Int. Cl.
| | |
|---|---|
| A47J 9/00 | (2006.01) |
| A01J 21/02 | (2006.01) |
| A21C 9/04 | (2006.01) |
| B05C 5/02 | (2006.01) |
| A23P 30/20 | (2016.01) |
| A23P 20/10 | (2016.01) |
| A21C 11/16 | (2006.01) |

(52) U.S. Cl.
CPC ................. *A47J 9/00* (2013.01); *A01J 21/02* (2013.01); *A21C 9/04* (2013.01); *A47J 9/001* (2013.01); *A21C 11/16* (2013.01); *A23P 20/10* (2016.08); *A23P 30/20* (2016.08); *A47J 9/005* (2013.01); *B05C 5/0229* (2013.01)

(58) Field of Classification Search
CPC ... A47J 9/00; A47J 9/001; A47J 9/005; A21C 9/04; A21C 11/12; A21C 11/16; A21C 11/10; A21C 3/02; A01J 21/02; B05C 5/02; B05C 5/0229; A23P 20/10; A23P 30/20; B01J 2/10
USPC ..... 118/24, 410; 222/80; 425/308, 316, 296, 425/382.4; 426/516, 549, 94, 249
See application file for complete search history.

(56) References Cited

U.S. PATENT DOCUMENTS

| | | | |
|---|---|---|---|
| 1,641,403 A | 9/1927 | Van Derhoef | |
| 3,280,764 A * | 10/1966 | Potter ....................... | A21C 1/02 366/195 |
| 3,333,567 A | 8/1967 | Rich et al. | |
| 4,195,489 A * | 4/1980 | Bernard ................... | A22C 7/00 426/524 |
| 4,413,973 A * | 11/1983 | Peters ..................... | A21C 11/16 425/382.3 |
| 4,614,489 A * | 9/1986 | Juravic .................... | A22C 7/00 264/169 |
| 4,942,842 A | 7/1990 | Siegenthaler et al. | |

(Continued)

FOREIGN PATENT DOCUMENTS

| | | |
|---|---|---|
| EP | 0324319 A1 | 7/1989 |
| GB | 2033291 A | 5/1980 |
| WO | 2005039324 A2 | 5/2005 |

*Primary Examiner* — Laura Edwards
(74) *Attorney, Agent, or Firm* — The Webb Law Firm

(57) ABSTRACT

The present invention relates to a device for dispensing a dispersion, in particular butter, comprising an input means for receiving the dispersion; a pump, for forcing the dispersion under pressure into; a tube, for leading the dispersion under pressure to a delivery unit, comprising a delivery mouth, having an essentially elongate opening; at least one scraper blade, arranged along a first long side of the opening and a collector for moist, arranged under the opening.

15 Claims, 2 Drawing Sheets

(56) References Cited

U.S. PATENT DOCUMENTS

2005/0123663 A1    6/2005  White et al.
2013/0029018 A1*   1/2013  Meier .................. B67D 3/0022
                                                        426/293

* cited by examiner

DEVICE FOR DISPENSING A DISPERSION

CROSS-REFERENCE TO RELATED APPLICATION

This application claims priority to European Patent Application No. 14165358.4 filed Apr. 22, 2014, the disclosure of which is hereby incorporated in its entirety by reference.

BACKGROUND OF THE INVENTION

Field of the Invention

The present invention relates to a device for dispensing a dispersion, such as butter. The invention relates to such device for use in a professional environment, and in particular forming part of a dough production line.

Description of Related Art

Dispersions comprise a mixture of water and oil or fat. In the example of butter, this mixture of oil and fat is supposed to be homogeneous. However, when put under pressure, the water is pressed out of the butter. This is as such not a direct problem for the baking process, since part of the water would evaporate during baking anyway, but when dispensed, the water may leak or poor out of the dispenser in such amount, that it influences the structure of the dough or its ingredients locally, or, due to the pressure, the water may be sprayed out of a dispenser opening and disturb the environment, which is undesired as well. Further disadvantages may be that the water leaks onto a conveyor belt, and causes dough remainings to stick to the belt, or slipping of the belt. It is therefore a goal of the present invention to provide a device for dispensing a dispersion, such as butter that lacks the above mentioned disadvantages.

SUMMARY OF THE INVENTION

The present invention thereto proposes a device for dispensing a dispersion, in particular butter, comprising an input means for receiving the dispersion, a pump, for forcing the dispersion under pressure into a tube, for leading the dispersion under pressure to a delivery unit, comprising a delivery mouth, having an essentially elongate opening, at least one scraper blade, arranged along a first long side of the opening and a collector for moist, arranged under the opening.

The input means may be a bin or container wherein a quantity of butter is deposited, and from which it can be pumped into a tube. Such tube may have any form, and serves to transport the dispersion from a location where it can fed into or onto the device, to a delivery location. The delivery location may in general be in a direct vicinity of the delivery opening, for instance besides or above a conveyor belt, in order to keep the distance over which the dispersion is transported via the tube is kept as short as possible. However, for reasons of ease of construction, it is often necessary to arrange the input means at a location where butter can easily be delivered to or where handling is possible.

The elongate delivery opening serves to dispense an essentially flat slice of the dispersion. However, since the tube may in most cases have an annular cross section, deformation of the dispersion takes place, and the water and fat of the dispersion are separated.

When the dispersion is pressed out of the elongate delivery opening, the water is urged to the surface of the dispersion, and the fat to concentrate in the centre. Therefore, the delivery unit comprises at least one scraper blade, arranged along a first long side of the opening. This may be the upper or the lower long side. The water, scraped from the dispersion, is collected in a collector arranged under the opening. Water or moist fallen into the collector are drained from there.

In an embodiment, the device comprises a second scraper blade, arranged at the other long side of the opening. In this configuration, the device is suitable for capturing both water and moist on the bottom side of the dispensed dispersion, as on top of the dispersion. Although fat normally floats on water, the specific form of the delivery unit and the curve the dispersion follows in its way may lead to water on top of the fat or the rest of the dispersion.

In a further embodiment, the elongate opening comprises a shutter, arranged movable between a position wherein it leaves the opening free, and a position where it at least partly closes the opening. With this shutter, the thickness of the dough slice can be influenced. However, with a smaller opening, a compression factor may be increased at the delivery point, with an increased amount of water as a result. For that reason, it is preferred that at least one of the scraper blades is arranged on the shutter.

The scraper blade is preferably flexible, so that it can engage the slice of the dispersion with a certain bias. The scraper blade then follows the surface of the dispersion, which leads to a more efficient scraping. The flexibility and efficiency of the scraper can further be increased when the scraper blade has a tapered cross section. Due to such shape, the scraper becomes less stiff towards its smallest side. The scraper blade can be made from any food grade material.

In order to compress the dispersion gradually, and to avoid impact on its composition and structure as good as possible, the delivery unit may have a body that gradually turns from a round cross section to a rectangular cross section. In a practical embodiment, such form can be created with a body that has a square cross section in between the transition from a round to a rectangular cross section.

BRIEF DESCRIPTION OF THE DRAWINGS

The invention will now be elucidated into more detail with reference to the following figures. Herein.

DETAILED DESCRIPTION OF THE INVENTION

Figure 1:
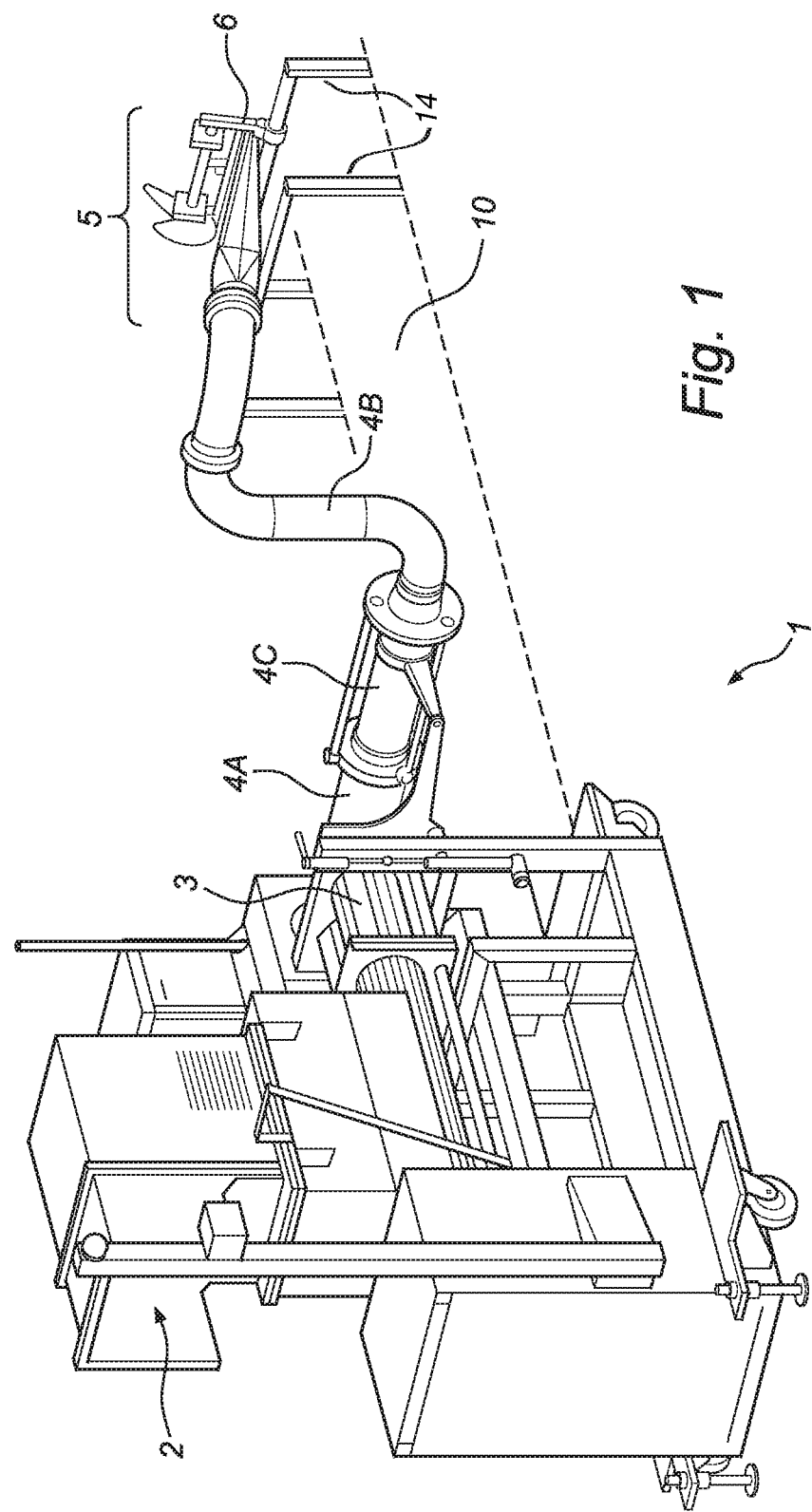
FIG. 1 shows a perspective overview of a device according to the present invention.

FIG. 1 shows an overview of a device 1 according to the present invention. The device 1 comprises an input means 2 for receiving the dispersion, a pump 3, for forcing the dispersion under pressure into a tube 4A, for leading the dispersion under pressure via a mohno pump 4C and tube 4B to a delivery unit 5, comprising, a delivery mouth 6, having an essentially elongate opening, at least one scraper blade 7, arranged along a first long side of the opening and a collector 8 for moist, arranged under the opening. The opening (visible in FIG. 2) is arranged above a conveyor 10, for instance for a dough product.

Figure 2:
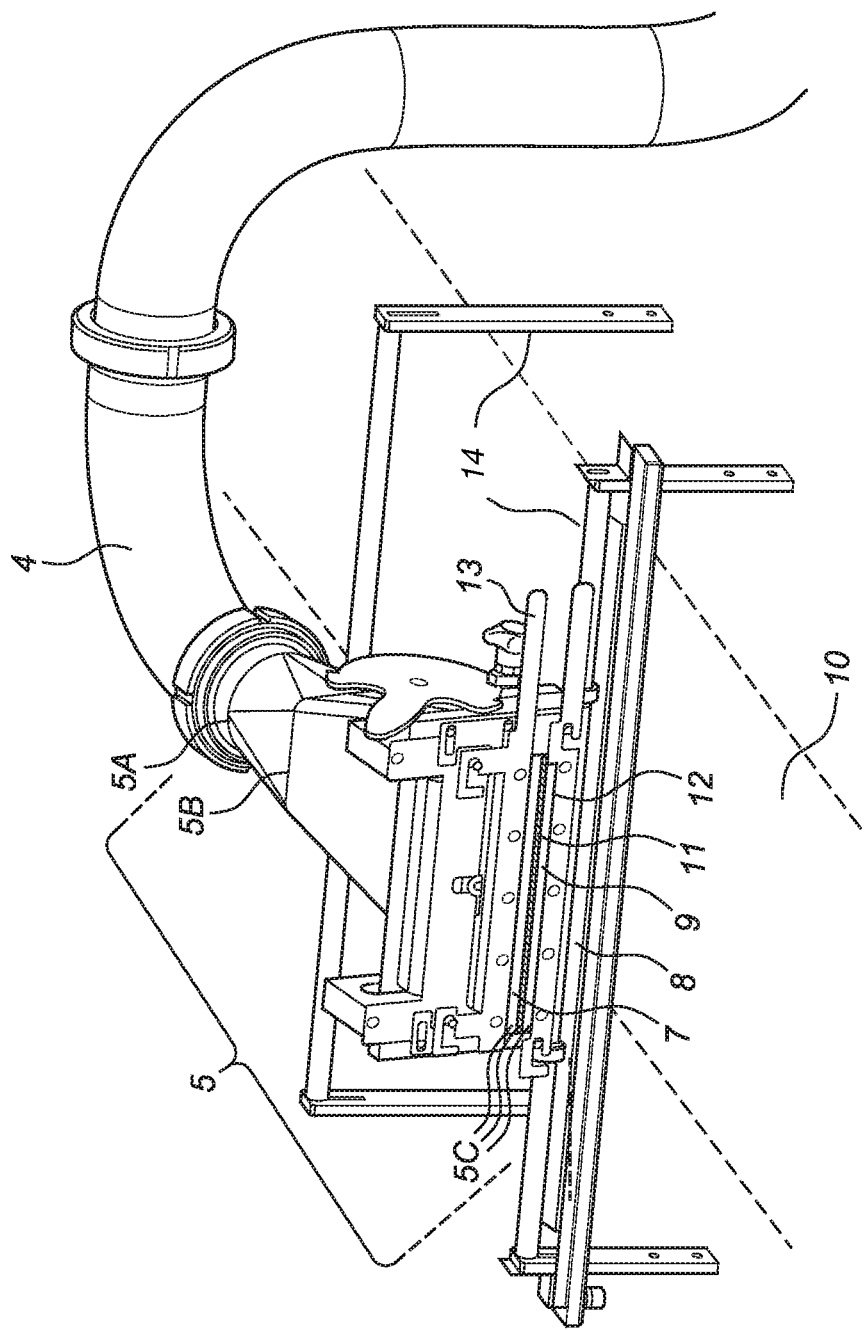
FIG. 2 shows a perspective detail of a device according to the present invention.

FIG. 2 shows a detailed view of the device from figure one. Besides a tube 4B, a delivery unit 5, comprising, a delivery mouth 6, having an essentially elongate opening 11, a first scraper blade 7, arranged along a first long side, being the upper side, of the opening 11 and a collector 8 for moist, arranged under the opening 11. The opening 11 is arranged above a conveyor 10, for instance for a dough product. The delivery unit 5 comprises a second scraper blade 12, arranged at the other long side, being the lower side, of the opening. The first scraper blade 7 is mounted on a shutter 13, arranged movable between a position wherein it leaves the opening 11 free, and a position where it at least partly closes the opening 11.

As visible in the figure, the delivery unit 5 has a body that gradually turns from a round cross section 5A to a rectangular cross section 5C. It has a body that has a square cross section 5B in between the transition from a round 5A to a rectangular 5C cross section.

The device further includes at least one rack 14 mounted above the conveyor 10 and spanning at least partly across the conveyor 10. The at least one rack 14 serves as a mounting location for the delivery unit 5 in order to position the delivery unit 5 above the conveyor 10. The collector 8 may also be mounted to the at least one rack 14, such that the collector 8 is arranged under the opening 11, as described above. The at least one rack 14 remains stationary as the conveyor 10 moves below the at least one rack 14.

The invention claimed is:

1. A device for dispensing a dispersion, the device comprising:
   a rack positioned above and at least partly spanning across a conveyor;
   a source or supply of edible dispersion;
   a receptacle for receiving the dispersion;
   a pump, for forcing the dispersion under pressure into;
   a tube, for leading the dispersion under pressure to:
   a delivery unit mounted to the rack, the delivery unit comprising:
   a body to receive the dispersion, and the body having a delivery mouth;
   the delivery mouth having an essentially elongate opening to dispense the dispersion therefrom; a shutter movably connected to the delivery unit, wherein the shutter is movable between a position wherein it leaves the opening free, and a position where it at least partly closes the opening;
   at least one scraper blade, arranged along a first long side of the opening and adapted to scrape moisture from a surface of the dispersion; and
   a collector for moisture separated from the dispersion, arranged under the opening and mounted to the rack.

2. The device according to claim 1, comprising a second scraper blade, arranged at the other long side of the opening.

3. The device according to claim 2, wherein at least one of the scraper blades is arranged on the shutter.

4. The device according to claim 1, wherein the scraper blade is flexible.

5. The device according to claim 1, wherein the scraper blade has a tapered cross section.

6. The device according to claim 1, wherein the scraper blade is made from a foodgrade material.

7. The device according to claim 1, wherein the body of the delivery unit gradually turns from a round cross section to a rectangular cross section.

8. The device according to claim 7, wherein the body of the delivery unit has a square cross section in between a transition from the round to the rectangular cross section.

9. The device according to claim 1, wherein the dispersion comprises butter.

10. The device according to claim 1, wherein the source of the edible dispersion comprises water and fat or oil.

11. A delivery unit, comprising:
    a body to receive a dispersion, and the body having a delivery mouth;
    the delivery mouth having an essentially elongate opening to dispense the dispersion therefrom;
    a shutter movably connected to the delivery mouth, wherein the shutter is movable between a position wherein it leaves the opening free, and a position where it at least partly closes the opening;
    at least one scraper blade, arranged along a first long side of the opening and adapted to scrape moisture from a surface of the dispersion; and
    a collector for moisture separated from the dispersion dispensed from the opening, arranged under the opening and mounted to a rack positioned above and at least partly spanning across a conveyor.

12. The delivery unit according to claim 11, comprising a second scraper blade, arranged at the other long side of the opening.

13. The delivery unit according to claim 12, wherein at least one of the scraper blades is arranged on the shutter.

14. The delivery unit according to claim 11, wherein the body of the delivery unit gradually turns from a round cross section to a rectangular cross section.

15. The delivery unit according to claim 14, wherein the body of the delivery unit has a square cross section in between a transition from the round to the rectangular cross section.

* * * * *